US009376516B2

(12) United States Patent
Gupta et al.

(10) Patent No.: US 9,376,516 B2
(45) Date of Patent: Jun. 28, 2016

(54) POROUS POLYMER STRUCTURES AND METHODS AND ARTICLES RELATING THERETO

(71) Applicants: Malancha Gupta, Los Angeles, CA (US); Scott J. Seidel, Los Angeles, CA (US); Philip J. Kwong, Los Angeles, CA (US)

(72) Inventors: Malancha Gupta, Los Angeles, CA (US); Scott J. Seidel, Los Angeles, CA (US); Philip J. Kwong, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 74 days.

(21) Appl. No.: 14/170,366

(22) Filed: Jan. 31, 2014

(65) Prior Publication Data

US 2014/0228463 A1    Aug. 14, 2014

Related U.S. Application Data

(60) Provisional application No. 61/760,328, filed on Feb. 4, 2013.

(51) Int. Cl.
| | |
|---|---|
| *B05D 5/00* | (2006.01) |
| *C08F 120/16* | (2006.01) |
| *C08F 2/00* | (2006.01) |
| *C09D 4/00* | (2006.01) |
| *C08F 220/56* | (2006.01) |

(52) U.S. Cl.
CPC ................ *C08F 120/16* (2013.01); *C08F 2/00* (2013.01); *C08F 220/56* (2013.01); *C09D 4/00* (2013.01)

(58) Field of Classification Search
CPC ........ C08F 120/16; C08F 2/00; C08F 220/56; C09D 4/00; B01D 67/0011; B01D 69/10; B01D 71/38; B01D 71/76; B01D 2325/36; B01D 71/26
See application file for complete search history.

(56) References Cited

U.S. PATENT DOCUMENTS

2013/0171546 A1* 7/2013 White ...................... B05D 1/60
                                                            429/508

OTHER PUBLICATIONS

Alf, M. E. et al. 2010. Sharp Hydrophilicity Switching and Conformality on Nanostructured Surfaces Prepared via Initiated Chemical Vapor Deposition (iCVD) of a Novel Thermally Responsive Copolymer. Macromol. Rapid Commun., 31, 2166-2172.
Audouin, F. et al. 2012. Polypeptide-Grafted Macroporous PolyHIPE by Surface-Initiated N-Carboxyanhydride (NCA) Polymerization as a Platform for Bioconjugation. Macromolecules, 45, 6127-6135.
Bamford, C. H. et al. 1960. Polymerization in the Solid and Near-Solid States. Journal of Polymer Science, 48, 37-51.
Bamford, C. H. et al. 1963. Studies in polymerization XIV. The solid-state polymerization of acrylic and methacrylic acids. Proceedings of the Royal Society A, 271, 357-378.
Caneba, G. T. et al. 1985. Polymer Membrane Formation through the Thermal-Inversion Process. 1. Experimental Study of Membrane Structure Formation. Macromolecules 1985, 18, 2538-2545.
Carroll, T. et al. 2002. Polyelectrolyte-grafted microfiltration membranes to control fouling by natural organic matter in drinking water. Journal of Membrane Science, 203, 3-13.
Chan, K. et al. 2005. Initiated Chemical Vapor Deposition of Linear and Cross-linked Poly(2-hydroxyethyl methacrylate) for Use as Thin-Film Hydrogels. Langmuir, 21, 8930-8939.
Choi, S.-H. et al. 2000. Electrochemical properties of polyethylene membrane modified with carboxylic acid group. Radiation Physics and Chemistry, 57, 179-186.
Dankers, P. Y. W. et al. 2005. A Modular and Supramolecular Approach to Bioactive Scaffolds for Tissue Engineering. Nature Materials, 4, 568-574.
Demirel, G. et al. 2010. Template-based and template-free preparation of nanostructured parylene via oblique angle polymerization. Thin Solid Films, 518, 4252-4255.
Gupta, M. et al. 2006. Large-scale Initiated Chemical Vapor Deposition of Poly(glycidyl methacrylate) Thin Films. Thin Solid Films, 515, 1579-1584.
Hsu, Y.-Y. et al. 1997. Effect of polymer foam morphology and density on kinetics of in vitro controlled release of isoniazid from compressed foam matrices. Journal of Biomedical Materials Research, 35, 107-116.
Ito, Y. 1992. Control of Water Permeation by pH and Ionic Strength through a Porous Membrane Having Poly(carboxylic acid) Surface-Grafted. Macromolecules, 25, 7313-7316.
Jenekhe, S. A. et al. 1999. Self-Assembly of Ordered Microporous Materials from Rod-Coil Block Copolymers. Science, 283, 372-375.
Kandula, M. 2011. Frost Growth and Dessification in Laminar Flow over Flat Surfaces. International Journal of Heat and Mass Transfer, 54, 3719-3731.
Kwong, P. 2011. Directed Deposition of Functional Polymers onto Porous Substrates Using Metal Salt Inhibitors. Langmuir, 27, 10634-10641.
Lau, K. K. S. et al. 2003. Superhydrophobic carbon nanotube forests. Nano Letters, 3, 1701-1705.

(Continued)

*Primary Examiner* — Irina S Zemel
(74) *Attorney, Agent, or Firm* — McDermott Will & Emery LLP

(57) ABSTRACT

A porous polymer structure may be formed by cooling a substrate to a temperature at or below a freezing point of a monomer, wherein the monomer is capable of free-radical polymerization; exposing the substrate to an initiator and the monomer, each in a vapor phase, wherein a concentration of the monomer in the vapor phase is above a saturation pressure of the monomer; converting the initiator to a free radical; crystalizing and depositing the monomer on the substrate; and polymerizing at least some of the monomer on the substrate, thereby forming a porous polymer structure on the substrate.

19 Claims, 15 Drawing Sheets

(56) References Cited

OTHER PUBLICATIONS

Li, D. et al. 2004. Morphological aspects and structure control of dual-layer asymmetric hollow fiber membranes formed by a simultaneous co-extrusion approach. J. Mem. Sci., 243, 155-175.

Limb, S. J. et al. 1997. Flexible fluorocarbon wire coatings by pulsed plasma enhanced chemical vapor deposition. J. Vac. Sci. Technol. A, 15, 1814-1818.

Lo, H. et al. 1995. Fabrication of Controlled Release Biodegradable Foams by Phase Separation. Tissue Engineering, 1, 15-28.

Matsuyama, H. et al. 2000. Structure control of anisotropic and asymmetric polypropylene membrane prepared by thermally induced phase separation. Journal of Membrane Science, 179, 91-100.

Mikos, A. G. et al. 1994. Preparation of macroporous poly(2-hydroxyethyl methacrylate) hydrogels by enhanced phase separation. Polymer, 35, 1068-1077.

Murphy, S. M. et al. 1992. Synthetic Hydrogels. Part 9—Preparation and Characterisation of Macroporous Hydrophilic Matrices. Journal of Materials Chemistry, 2, 1007-1013.

Na, B. et al. 2004. New Model for Frost Growth Rate.. International Journal of Heat and Mass Transfer, 47, 925-936.

Oxley, H. R. et al. 1993. Macroporous hydrogels for biomedical applications: methodology and morphology. Biomaterials, 14, 1064-1072.

Perez, P. et al. 2008. Bioresorbable and Nonresorbable Macroporous Thermosensitive Hydrogels Prepared by Cryopolymerization. Role of the Cross-Linking Agent. Biomacromolecules, 9, 66-74.

Sa-nguanruksa, J. et al. 2004. Porous polyethylene membranes by template-leaching technique: preparation and characterization. Polymer Testing, 23, 91-99.

Savina, I.N. et al. 2007. Cryogels from poly(2-hydroxyethyl methacrylate): macroporous, interconnected materials with potential as cell scaffolds. Soft Matter, vol. 3, pp. 1176-1184.

Smolders, C. .A. et al. 1992. Microstructures in phase-inversion membranes. Part 1. Formation of macrovoids. Journal of Membrane Science, 73, 259-275.

Strathmann, H. et al. 1977. The formation mechanism of phase inversion membranes. Desalination, 21, 241-255.

Svec, F. 2004. Preparation and HPLC applications of rigid macroporous organic polymer monoliths. Journal of Separation Science, vol. 27, pp. 747-766.

Tao, R. et al. 2012. Condensation and Polymerization of Supersaturated Monomer Vapor. Langmuir, 28, 16580-16587.

Tao, R. et al. 2013. Porous Polymers by Controlling Phase Separation during Vapor Deposition Polymerization. Macromolecular Rapid Communications, 34, 1755-1760.

Tenhaeff, W. E. et al. 2008. Initiated and Oxidative Chemical Vapor Deposition of Polymeric Thin Films: iCVD and oCVD.. Adv. Funct. Mater., 18, 979.992.

Ulbricht, M. 2006. Advanced Functional Polymer Membranes. Polymer, 47, 2217-2262.

Van Leeuwen, C. 1979. On the Driving Force for Crystallization: The Growth Affinity.. J. Crystal Growth, 46, 91-95.

Wang, Y. et al. 2005. Remarkable Reduction of Irreversible Fouling and Improvement of the Permeation Properties of Poly(ether sulfone) Ultrafiltration Membranes by Blending with Pluronic F127. Langmuir, 21, 11856-11862.

Widawski, G. et al. 1994. Self-organized Honeycomb Morphology of Star-Polymer Polystyrene Films. Nature, 369, 387-389.

Xue, W. et al. 2002. Rapid swelling and deswelling of thermoreversible hydrophobically modified poly(N-isopropylamide) hydrogels prepare by freezing polymerization. Polymer, 43, 5181-5186.

Yabu, H. et al. 2005. Single-Step Fabrication of Transparent Superhydrophobic Porous Polymer Films. Chemistry of Materials, 17, 5231-5234.

Zhang, H. et al. 2005. Aligned Two- and Three-Dimensional Structures by Directional Freezing of Polymers and Nanoparticles. Nature Materials, 4, 787-793.

\* cited by examiner

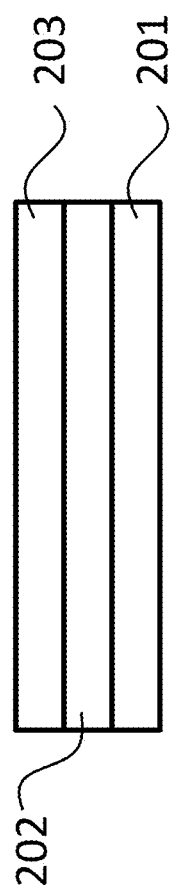
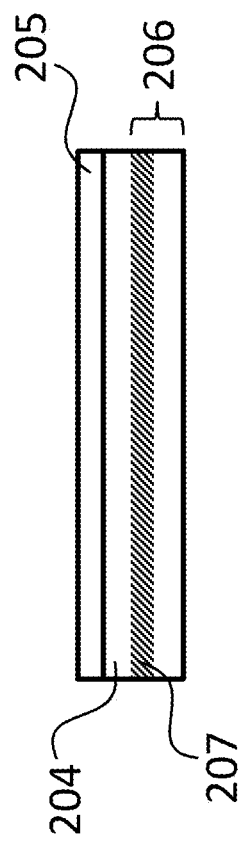

POROUS POLYMER STRUCTURES AND METHODS AND ARTICLES RELATING THERETO

CROSS-REFERENCE TO RELATED APPLICATIONS

This application claims priority to U.S. Provisional Application No. 61/760,328 filed on Feb. 4, 2013 and entitled "One-Pot Fabrication of Porous Polymer Membranes via Vapor Phase Polymerization," which is incorporated herein by reference.

BACKGROUND

The present application relates to porous polymer structures, and methods and systems relating thereto.

Porous polymer structures (e.g., membranes) have a wide range of uses in purification, filtration, and biomedical applications. Controlling the chemical and structural nature of these membranes may improve their efficacy in current applications and expand their use to novel applications.

Solution phase processing (e.g., electrospinning, thermally induced phase separation, and solution casting particulate leaching) has typically been used to fabricate porous polymer membranes. However, solution phase processing has inherent disadvantages in that solubility requirements must be met for all precursors, which restrict the ability to combine typically incompatible materials, which hampers the degree of chemical and structural control.

SUMMARY

The present application relates to porous polymer structures, and methods and systems relating thereto.

In some embodiments, a method may include cooling a substrate to a temperature at or below a freezing point of a monomer, wherein the monomer is capable of free-radical polymerization; exposing the substrate to an initiator and the monomer, each in a vapor phase, wherein a concentration of the monomer in the vapor phase is above a saturation pressure of the monomer; converting the initiator to a free radical; crystalizing and depositing the monomer on the substrate; and polymerizing at least some of the monomer on the substrate, thereby forming a porous polymer structure on the substrate.

In some embodiments, a method may include cooling a substrate to a temperature at or below a freezing point of a first monomer, wherein the first monomer is capable of free-radical polymerization; exposing the substrate to a first initiator and the first monomer, each in a vapor phase, wherein a concentration of the first monomer in the vapor phase is above a saturation pressure of the first monomer; converting the first initiator to a first free radical; crystalizing and depositing the first monomer on the substrate; polymerizing at least some of the first monomer on the substrate, thereby forming a porous polymer structure on the substrate; cooling the porous polymer structure to a temperature at or below a freezing point of a second monomer, wherein the second monomer is capable of free-radical polymerization; exposing the porous polymer structure to a second initiator and the second monomer, each in the vapor phase, wherein a concentration of the second monomer in the vapor phase is above a saturation pressure of the second monomer; depositing the second monomer as on the porous polymer structure; polymerizing at least some of the second monomer on the porous polymer structure, thereby producing the porous polymer structure with a first layer comprising a polymer of the first monomer and a second layer comprising a polymer of the second monomer.

In some embodiments, an article may include a porous polymer structure that comprises microstructures that comprise a polymer, wherein the polymer is a polymerization product of reactants that comprise a free radical and a monomer; and wherein the porous polymer structure has two types of pores: (1) intracrystalline pores within the microstructures; and (2) intercrystalline pores between the microstructures, wherein a pore size of at least some of the intracrystalline pores is about 10 nm to about 10 microns, and wherein a pore size of at least some of the intercrystalline pores is about 1 micron to about 500 microns.

The features and advantages of the present disclosure will be readily apparent to those skilled in the art upon a reading of the description of the preferred embodiments that follows.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIGS. 2A-B provide representations of porous polymer structures described herein as portions of layered articles.

DETAILED DESCRIPTION

The present application relates to porous polymer structures, and methods and systems relating thereto.

Methods for producing porous polymer structures described herein utilize vapor phase polymerization techniques ("VPP") (e.g., initiated chemical vapor deposition ("iCVD")) to deposit monomers from a vapor phase onto a substrate for polymerization. In these methods, the surfaces are maintained at a temperature below the freezing point of the monomers, so that the monomers form crystals as they are deposited on the substrate. Deposition as crystals may provide a structure of monomers that can be polymerized in situ and maintain that structure, which, in some instances, may allow for the formation of porous polymer structures rather than a nonporous film if the monomers were polymerized from a vapor phase or a liquid phase condensed on the substrate. Further, by avoiding the liquid phase, the VPP methods described herein mitigate deformation (e.g., wrinkling) of the substrate (e.g., paper), surface tension issues, and monomer compatibility restrictions caused by the liquid phase interacting with the substrate or with other liquids.

Figure 1:
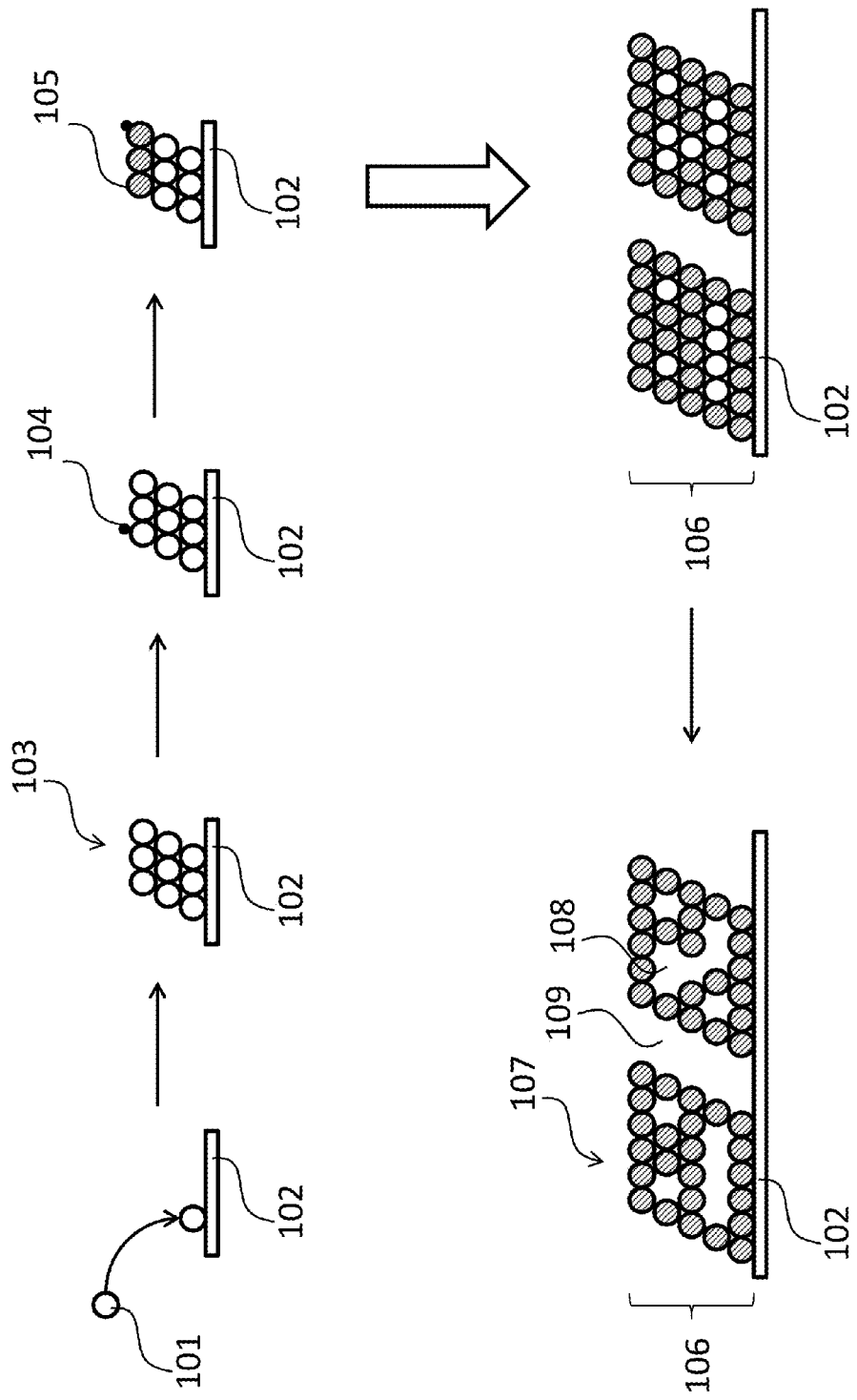
FIG. 1 provides a hypothetical schematic of the VPP methods described herein.

Without being limited by theory, FIG. 1 provides a hypothetical schematic of the VPP methods described herein. First, monomers 101 may be deposited on the substrate 102 from the vapor phase and form crystals 103 on the substrate 102. Generally, the partial pressure of the monomer 101 in the vapor phase is above the saturation pressure of the monomer 101 at the temperature of the substrate 102. It is believed that by maintaining this partial pressure, the monomers 101 are driven to crystallization on the substrate 102.

After deposition crystallization, a free radical 104 from the vapor phase may react with one of the monomers 101 to initiate polymerization of at least some of the monomers 101 (i.e., form a polymer 5). As this process continues, a porous polymer structure 106 may form. Then, the temperature and pressure conditions may be changed to allow for the monomer 101 to sublime and be removed from the porous polymer structure 106. In some instances, this method may form a porous polymer structure 106 that comprises microstructures (illustrated as pillar microstructures 107). In some instances, the porous polymer structure 106 may have two types of pores: (1) intracrystalline pores 108 within the pillar microstructures 107 and (2) intercrystalline pores 109 between the pillar microstructures 107.

Using the VPP methods described herein to produce porous polymer structures allows for controlling the growth rate and pore size of the porous polymer structure while eliminating liquid phase issues related to solvent compatibility and surface tension. Accordingly, these methods may be useful in fabricating tailored structures from the bottom-up for use in filtration, separations, tissue scaffolding, microfluidics devices, self-cleaning coatings, insulating materials, drug delivery, and chemical and biological sensing applications.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments disclosed herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

Substrates suitable for use in the VPP methods described herein are not necessarily limited by size, shape, or composition provided the local environment around the substrate and temperature of the substrate can be adequately controlled to perform the VPP methods.

Examples of materials that the substrate may be formed of may include, but are not limited to, natural materials (e.g., cellulose and wood), metals (e.g., silicon, copper, and stainless steel), ceramics (e.g., silica, titania, and glass), polymers (e.g., fluoropolymers, polyethylene, polysiloxanes, polystyrene, parylene, and polyethylene oxide), and the like, and any hybrid thereof.

In some embodiments, a substrate may be substantially flat (e.g., a wafer, glass, and the like). In some instances, a substrate may be textured. In some embodiments, a substrate may have a 3-dimensional structure (e.g., a screw, a substrate with trenches designed for microfluidics applications, and the like). In some embodiments, a substrate may be porous (e.g., a piece of paper, an open-cell foam, a zeolite, and the like). Combinations and hybrids of the foregoing may also be suitable.

Cooling of the substrate may be achieved by a plurality of systems and methods. For example, the substrate may be cooled by thermo-electric coolers, water-based chillers, methanol-based chillers, dry ice, liquid nitrogen, and the like. In some instances, the substrate may be placed on a stage or other device, where the stage, and consequently the substrate, is cooled by a suitable method or system. The use of a stage or other device should not be taken to limit the orientation of the substrate. That is, the substrate may be rotated along any axis or oriented along any angle relative to the stage provided sufficient cooling is achieved, where cooling may be provided by the stage and optionally other systems or methods.

Some embodiments may involve directing or limiting the location of the porous polymer structure on the substrate. For example, masking may be used to physically prevent or mitigate the formation of a porous polymer structure on portions of the substrate. Masking may be by any known technique including physical masking and lift-off photolithography. In another example, portions of the substrate may be chemically and/or physically treated to have a higher surface energy, greater roughness, or both. In some instances, such surface modifications may provide sites that favor forming crystals of the monomers, thereby preferentially (not necessarily exclusively) forming the polymer structure on the surface treated portions of the substrate.

In some embodiments, the substrate may be moving during the formation of the porous polymer structure. For example, a flexible polymer film may be used as the substrate in a roll-to-roll continuous VPP system for formation of the porous polymer structure on the flexible polymer film.

Monomers suitable for use in the VPP methods described herein are capable of free radical polymerization. Examples of monomers suitable for use in the VPP methods described herein may include, but are not limited to, N-isopropylacrylamide, methacrylic acid, 2-hydroxyethyl methacrylate, ethylene glycol dimethacrylate, glycidyl methacrylate, methyl methacrylate, styrene, 1H,1H,2H,2H-perfluorodecyl acrylate, 4-vinylpyridine, o-nitrobenzyl methacrylate, pentafluorophenyl methacrylate, and the like, and any combination thereof.

In some instances, the VPP methods described herein may be performed with two or more monomers in the vapor phase, wherein the polymer produced is a copolymer of the two or more monomers. The composition of the polymer produced may be controlled by the relative concentration of each monomer in the vapor phase.

When two or more monomers are utilized, the reaction conditions should be set such that, for at least one of the monomers, both of the following are satisfied: (1) the partial pressure of the monomer is above the saturation pressure of the monomer at the temperature of the substrate and (2) the temperature of the substrate is at or below the freezing point of the monomer. Accordingly, in some instances, VPP methods described herein may be performed with two or more monomers where (1) the partial pressure of a first monomer is above the saturation pressure of the first monomer at the temperature of the substrate, (2) the temperature of the substrate is at or below the freezing point of the first monomer, (3) the partial pressure of the second monomer (third monomer, etc., each independently) is above, at, or below the saturation pressure of that monomer at the temperature of the substrate, and (4) the temperature of the substrate is above, at, or below the freezing point of the second monomer (third monomer, etc., each independently).

In some instances, an initiator may be present in the vapor phase as a precursor to the free radicals that initiate polymerization of the monomers. Conversion of the initiator to free radicals in the vapor phase may be performed by any suitable method. For example, a heated filament may be used to thermally cleave the initiator into free radicals. In some instances, initiation into free radicals may be achieved by using an ultraviolet light source or a plasma source.

In some embodiments, the partial pressure of the initiator in the vapor phase may range from a lower limit of about 1 mTorr, 5 mTorr, or 25 mTorr to an upper limit of about 300 mTorr, 200 mTorr, or 100 mTorr, wherein the partial pressure of the initiator in the vapor phase may range from any lower limit to any upper limit and encompass any subset therebetween.

Examples of initiators suitable for use in the VPP methods described herein may include, but are not limited to, t-butyl peroxide, azobisisobutyronitrile, perfluorooctane sulfonyl fluoride, t-amyl peroxide, triethylamine, and the like, and any combination thereof.

Some embodiments may involve crosslinking the polymer of the porous polymer structure. Crosslinkers, in some instances, may impart additional mechanical strength to the porous polymer structure.

Examples of crosslinkers suitable for use in the VPP methods described herein may include, but are not limited to, ethylene glycol diacrylate, ethylene glycol dimethacrylate, divinylbenzene, and the like, and any combination thereof.

In some embodiments, crosslinking may be achieved in situ by including crosslinkers in the vapor phase for deposition and reaction with the monomers.

In some embodiments, the partial pressure of the crosslinkers in the vapor phase may range from a lower limit of about 1 mTorr, 5 mTorr, or 25 mTorr to an upper limit of about 300 mTorr, 200 mTorr, or 100 mTorr, wherein the partial pressure of the crosslinkers in the vapor phase may range from any lower limit to any upper limit and encompass any subset therebetween.

In some instances, crosslinking may be achieved by annealing the porous polymer structure after fabrication. In some instances, crosslinking may be achieved by exposing the porous polymer structure after fabrication to a crosslinker (e.g., in the liquid phase or the gas phase). For example, a solution of a diamine may be used to crosslink at least a portion of a porous polymer structure comprising poly(methacrylic acid). In some embodiments, a combination of the foregoing crosslinking methods (optionally in combination with in situ crosslinking) may be performed.

In forming the porous polymer structure described herein, the reaction conditions (e.g., partial pressure of each reactant, temperature of the substrate, reaction time, and the like) may affect thickness of the porous polymer structure, the pore sizes of the intracrystalline pores, the pore sizes of the intercrystalline pores, and the porosity of the porous polymer structure.

In some instances, the thickness of a porous polymer structure described herein may range from a lower limit of about 50 nm, 100 nm, 500 nm, 1 micron, 10 microns, or 100 microns to an upper limit of about 10 mm, 1 mm, 500 microns, or 100 microns, wherein the thickness of the porous polymer structure may range from any lower limit to any upper limit and encompass any subset therebetween. One skilled in the art would readily recognize that the thickness of a porous polymer structure described herein may be outside the preferred ranges described herein with modifications to the reaction conditions.

In some instances, after forming the porous polymer structure, the porous polymer structure may be removed from the substrate (e.g., by peeling or by dissolving/decomposing the substrate). As such, the porous polymer structure should be sufficiently thick to be self-supporting (e.g., greater than about 1 micron).

In some instances, a porous polymer structure described herein may have a microstructure (e.g., as illustrated in FIG. 1 and the examples). The shape of the microstructure and presence or absence of intracrystalline pores in the microstructure may depend on, inter alia, the composition of the monomer(s) for which the substrate is at or below the freezing point thereof and the reaction time. Examples of microstructures may include, but are not limited to, pillars (i.e., elongated structures that generally are flat at the ends and substantially perpendicular to the substrate (e.g., illustrated in FIG. 3)), needles (i.e., elongated structures that generally tapper at the ends and may have any orientation (e.g., illustrated in FIG. 7)), and the like.

In some instances, the pore size of the intracrystalline pores may range from a lower limit of about 10 nm, 100 nm, 500 nm, or 1 micron to an upper limit of about 10 microns, 5 microns, 1 micron, or 500 nm, wherein the pore size of the intracrystalline pores may range from any lower limit to any upper limit and encompass any subset therebetween. One skilled in the art would readily recognize that the pore size of the intracrystalline pores may be outside the preferred ranges described herein with modifications to the reaction conditions. Intracrystalline pore sizes may be determined by digital analysis of high-resolution scanning electron micrographs or transmission electron micrographs.

In some instances, the pore size of the intercrystalline pores may range from a lower limit of about 1 micron, 10 microns, 50 microns, or 100 microns to an upper limit of about 500 microns, 250 microns, 100 microns, or 50 microns, wherein the pore size of the intercrystalline pores may range from any lower limit to any upper limit and encompass any subset therebetween. One skilled in the art would readily recognize that the pore size of the intercrystalline pores may be outside the preferred ranges described herein with modifications to the reaction conditions. Intracrystalline pore sizes may be determined by digital analysis of scanning electron micrographs or transmission electron micrographs.

In some instances, the porosity of a porous polymer structure described herein may range from a lower limit of greater than 0%, about 1%, 5%, 10%, 25%, or 50% to an upper limit of about 99%, 75%, 50%, or 25%, wherein the porosity of the porous polymer structure may range from any lower limit to any upper limit and encompass any subset therebetween. One skilled in the art would readily recognize that the porosity of the porous polymer structure may be outside the preferred ranges described herein with modifications to the reaction conditions. Porosity may be determined gravimetrically.

In some embodiments, the reaction conditions may be changed during the VPP methods described herein to produce an asymmetric porous polymer structure. In some embodiments, the reaction conditions may be changed during deposition to control the chemistry or morphology of the porous structure as it is growing. For example, monomers, reactor pressure, precursor flow rates, and substrate temperature may each be independently varied during the fabrication of a porous polymer structure to tailor the porosity or chemical composition (e.g., by varying the ratio of two or more monomers, the ratio of crosslinker to monomer(s), and the like) through the thickness.

In some embodiments, the surface chemistry of a porous polymer structure may be changed by functionalization of the polymer of the porous polymer structure with minimal effect on the microstructure of the porous polymer structure. That is a reactive moiety of the polymer of the porous polymer structure (e.g., amines, carboxylic acids, alcohols, azides, alkynes, and the like) may, in some instances, be functionalized (e.g., vapor phase functionalization, liquid phase functionalization, and the like) with a chemical(s). For example, an alkyl amine may be reacted with the carboxyl groups of poly(methacrylic acid) or the like that form at least a portion of the porous polymer structure, so as to increase the hydrophobicity of the porous polymer structure. In some instances, a masking technique may be used to change the surface chemistry of only a desired portion of a porous polymer structure.

In some embodiments, a layer may be deposited on a portion of a porous polymer structure described herein. Layers may be porous or dense. In some instances, a layer may be conformal (i.e., primarily deposited on the microstructure of the porous polymer structure), independent (i.e., primarily deposited on the porous polymer structure with minimal deposition on and/or coating of the microstructure of the porous polymer structure), or a combination thereof (e.g., a conformal layer that is deposited with a thickness to also produce an independent layer). For example, as illustrated in FIG. 2A, a porous polymer structure 202 disposed on a substrate 201 may have an independent layer 203 disposed thereon. In another example, as illustrated in FIG. 2B, a porous polymer structure 204 that has been removed from its corresponding substrate may have an independent layer 205 disposed on one side of the porous polymer structure 204 and a conformal/independent layer 206 disposed on the other side of the porous polymer structure 204 where the conformal portion 207 of the conformal/independent layer 206 is represented by the hatch marks. While these examples provide illustrative embodiments, one skilled in the art would appreciate that more complex structures can be produced with each layer being of any suitable composition (e.g., metals, metal oxides, ceramics, polymers, and the like) with any degree of porosity, with masks being used to direct deposition of each layer, and with as many layers as desired (e.g., 5 layers total, 25 layers total, over 100 layers total where at least one layer is a porous polymer structure described herein). It should be noted that unless otherwise specified, the term "layer" refers to a conformal layer, an independent layer, or both, which may be porous or dense.

Layers may be formed of any suitable material including, but not limited to, polymers, metals, ceramics, and combinations thereof. Examples of polymers suitable for use in a layer may include, but are not limited to, polyolefins, polyesters, polyamines, fluoropolymers, stimuli-responsive polymers (e.g., responsive to pH, light, temperature, and the like poly (methacrylic acid), poly(o-nitrobenzyl methacrylate), and poly(N-isopropylacrylamide)), functional polymers (i.e., polymers with a pendent moiety that can be functionalized like amines, carboxylic acids, alcohols, azides, alkynes, and the like), and the like. Examples of metals suitable for use in a layer may include, but are not limited to, copper, gold, iron, and the like. Examples of ceramics suitable for use in a layer may include, but are not limited to, oxides (e.g., spin-on-glass, silica, titania, alumina, and the like), carbides, borides, nitrides, silicides, and the like.

In some embodiments, layers may be applied to a portion of a porous polymer structure described herein by performing a VPP deposition (e.g., according to the methods described herein or under other conditions where a liquid phase is observed). For example, during the production of a porous polymer structure, the partial pressure of the monomer may be lowered to less than the saturation concentration, such that a dense polymer layer is formed on the porous polymer structure. In another example, a VPP method described herein may be performed with a different monomer after forming a first porous polymer structure, thereby producing a second porous polymer structure as a layer (conformal, individual, or both) on the first porous polymer structure.

In some embodiments, layers may be applied to a portion of a porous polymer structure described herein by another method (e.g., spin coating, sputter coating, e-beam evaporation, atomic layer deposition, spray coating, dip coating, CVD, and the like). Methods of producing layered articles may involve a variety of layer deposition/application methods described herein.

In some instances, a masking technique may be used to apply/deposit the layer on only a desired portion of a porous polymer structure.

The thickness of a layer on a porous polymer structure may be varied for a particular application. One of ordinary skill in the art would recognize suitable thicknesses for layers based on, inter alia, the application, composition of the layer, and deposition method. For example, in some instances, a conformal layer or conformal portion of a layer may be thin (e.g., about 20 nm to about 100 nm) so as to minimally affect the pore size and porosity of the porous polymer structure.

A porous polymer structure described herein may have several applications. In some embodiments, the porous polymer structures described herein may be directly deposited onto microfluidic devices (e.g., poly(dimethylsiloxane) or poly (methyl methacrylate) or silicon-based devices or paper-based devices) to allow for on-chip separation of molecules.

In another example, a porous polymer structure described herein may be utilized as (or as part of) a fluid filter (e.g., for water filtration and purification). Advantageously, antifouling layers (e.g., comprising hydrophobic or charged polymers) can be easily applied to the porous polymer structures, a technique that currently is expensive to achieve. Additionally, with the ability to create a porous polymer structure of different polymers (e.g., in a stacked or layered configuration where both polymers have a microstructure suitable for filtration), filters may, in some instances, be produced that can provide both anionic and cation filtration in a single article.

In another example, a porous polymer structure described herein may be used as filters or substrates (or portions thereof) that respond to external stimuli (e.g., pH, light, or temperature). For example, a porous polymer structure comprising a stimuli responsive polymer may be loaded with a drug or other small molecule (e.g., the drug or other small molecule may be intercalated into the microstructure of the porous polymer structure), wherein upon stimulation the release rate of the drug or other small molecule from the porous polymer structure may be changed. In another example, cells may be deposited or grown on a porous polymer structure comprising a stimuli responsive polymer, wherein upon stimulation the cells may be released from the porous polymer structure.

One or more illustrative embodiments incorporating the embodiments disclosed herein are presented herein. Not all features of a physical implementation are described or shown in this application for the sake of clarity. It is understood that in the development of a physical embodiment incorporating the embodiments disclosed herein, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments presented herein, the following examples of preferred or representative embodiments are given. In no way should the following examples be read to limit, or to define, the scope of the embodiments presented herein.

EXAMPLES

Example 1

N-isopropylacrylamide ("NIPAAm") (Aldrich, 97%, freezing point 64° C.), methacrylic acid ("MAA") (Aldrich, 99%, freezing point 14° C.), ethylene glycol diacrylate ("EGDA") (Aldrich, 98%, freezing point −41° C.), and t-butyl peroxide ("TBPO") (Aldrich, 98%) were used as received without further purification. Monomer freezing point values were measured using differential scanning calorimetry (DSC) (TA Instruments Q2000).

A silicon wafer (Wafer World) was placed on top of thermoelectric cooler (TE Technology, Custom Thermoelectrics), which was located inside an iCVD vacuum chamber system (GVD Corporation). The chamber was a custom-designed pancake-shaped reactor (250 diameter, 48 mm height) evacuated by a rotary vane pump (Edwards E2M40). The pressure was kept constant using a throttle valve (MKS 153D) and measured using a capacitance manometer (MKS Baratron 622A01TDE).

The initiator (TBPO) was kept at room temperature and fed into the chamber at a flow rate of 0.7 sccm using a mass flow controller (MKS 1479A), to achieve the desired reactor pressure. The nichrome filament array was then resistively heated to 250° C., which thermally cleaved the initiator into free radicals. The thermoelectric cooler was then equilibrated at the desired temperature by controlling the input current. Finally, the monomer was introduced into this system, where the flow rate was controlled by heating the source jar. Reaction times ranged from 2 to 90 minutes, after which the precursor flow was stopped, the filament array was turned off, and the sample was allowed to pump out at base pressure until all the excess monomer was removed.

For the fabrication of poly-NIPAAm ("PNIPAAm") porous polymer structures, NIPAAm was maintained at a flow rate of 0.5 sccm. For the fabrication of poly-MAA ("PMAA") porous polymer structures, MAA was maintained at a flow rate of 4.0 sccm. For the fabrication of poly(MAA-co-EGDA) ("P(MAA-co-EGDA)") porous polymer structures, reactions conditions were the same as those described for the formation of PMAA with the addition of flowing 0.2 sccm of EGDA. The EGDA flow rate was chosen to keep it below its saturation pressure and only in the vapor phase such that the solid MAA structures act as the template around which the porous copolymer structure is formed. Depending on the reactor pressure used, the following partial pressures were observed: 10-300 mTorr for TBPO, 80-400 mTorr MAA, and 30-300 mTorr for NIPAAm The chemical composition of each of the PNIPAAm porous polymer structures, PMAA porous polymer structures, and P(MAA-co-EGDA) porous polymer structures was confirmed using Fourier transform infrared spectroscopy (FTIR) (Thermo Nicolet iS10). The spectra were baseline corrected and normalized based on the carbonyl peak.

The structural characteristics of the various porous polymer structures were studied using a scanning electron microscope ("SEM") (JEOL-7001, JEOL-6610) at a 10 kV accelerating voltage. The samples were gold sputtered for 20 seconds prior to imaging.

Figure 3:
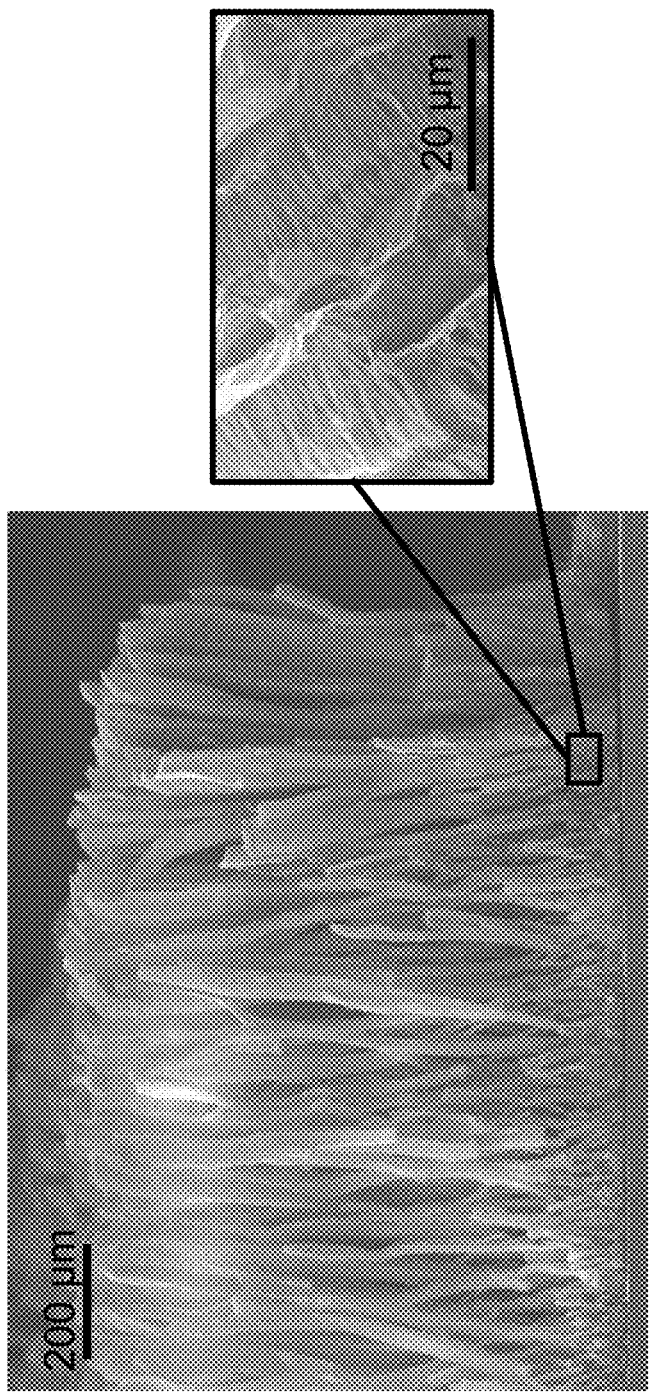
FIG. 3 provides side-view SEM images at two magnifications of a PMAA porous polymer structure illustrating the intercrystalline pores between the pillar microstructures and the intracrystalline pores within the pillar microstructures at the higher magnification.

FIG. 3 provides a side view at two magnifications of a PMAA porous polymer structure that clearly show the intercrystalline pores between the pillar microstructures at the lower magnification and the intracrystalline pores within the pillar microstructures at the higher magnification.

Figure 4:
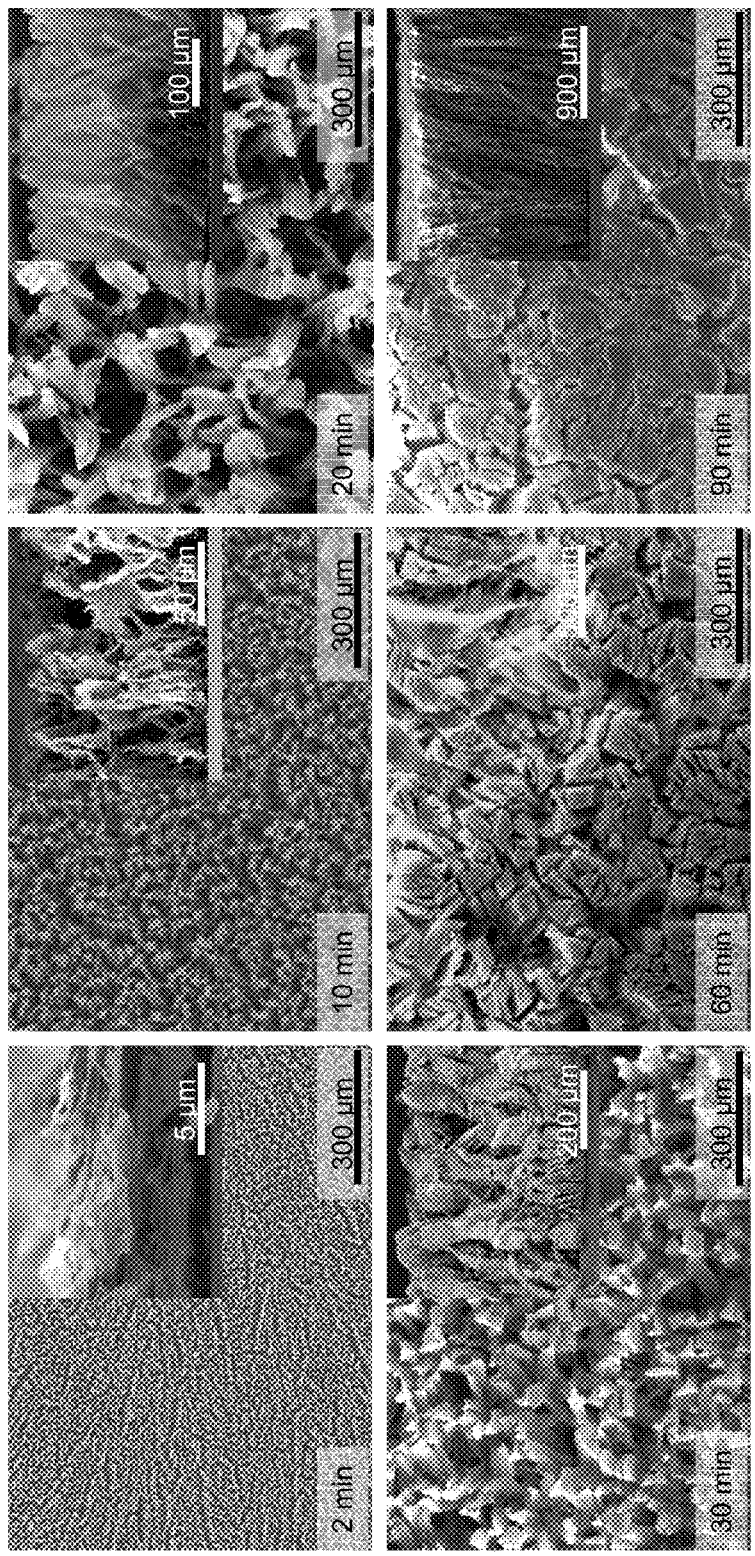
FIG. 4 provides a series of SEM images showing a PMAA porous polymer structure (top view images with cross-section view image inserts) at various reaction times.
Figure 5:
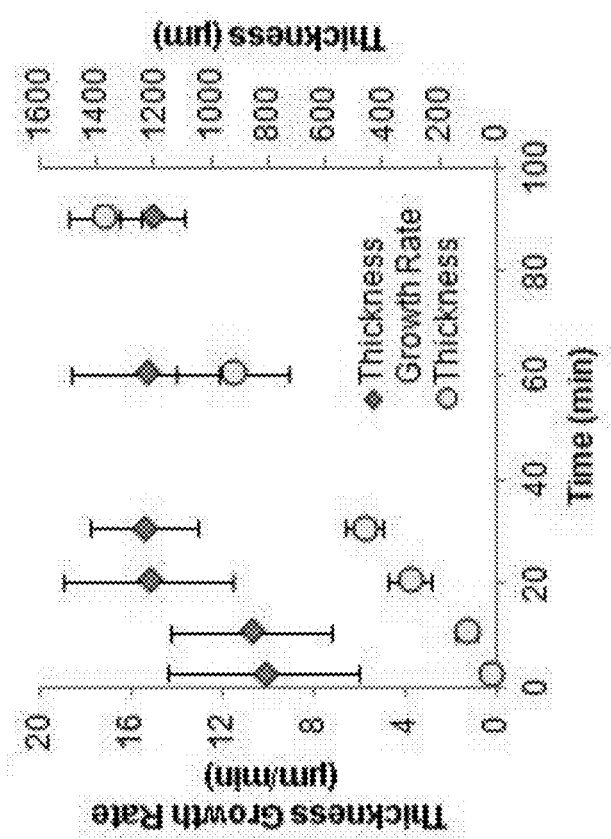
FIG. 5 provides a graph of growth rate and thickness versus reaction time for a PMAA porous polymer structure.

FIG. 4 provides a series of SEM images showing a PMAA porous polymer structure (top view images with cross-section view image inserts) at 2 min, 10 min, 20 min, 30 min, 60 min, and 90 min of growth. FIG. 5 provides a graph of growth rate and thickness versus reaction time.

Figure 6:
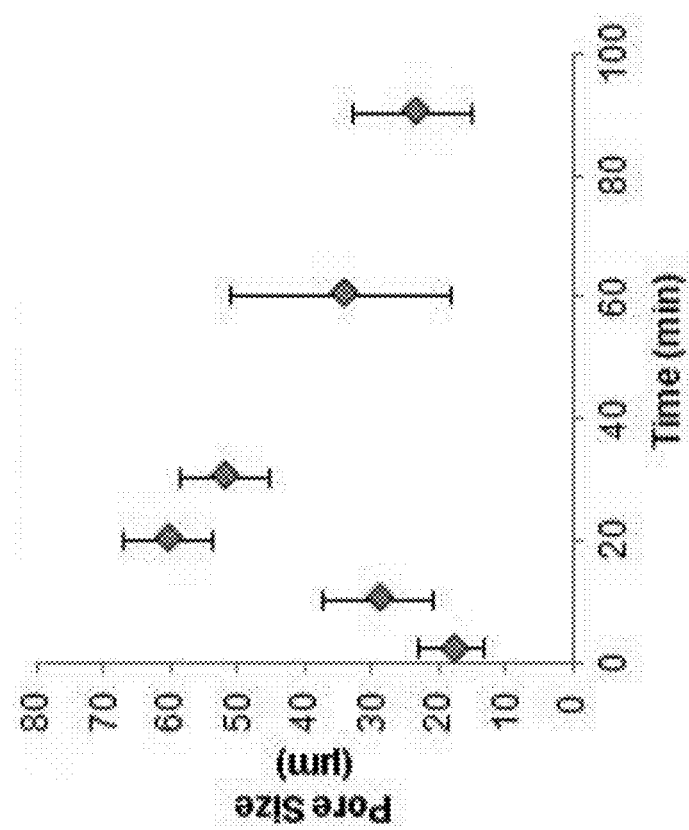
FIG. 6 provides a graph of the intercrystalline pore size as a function of growth time of a PMAA porous polymer structure.

The pore size of the PMAA porous polymer structure was measured by analyzing the SEM images. ImageJ software was used to visually determine the location and estimate the size of the pores. The resulting pore size distributions were averaged to provide an average pore size value for that sample. FIG. 6 provides a graph of the intercrystalline pore size as a function of growth time.

Figure 7:
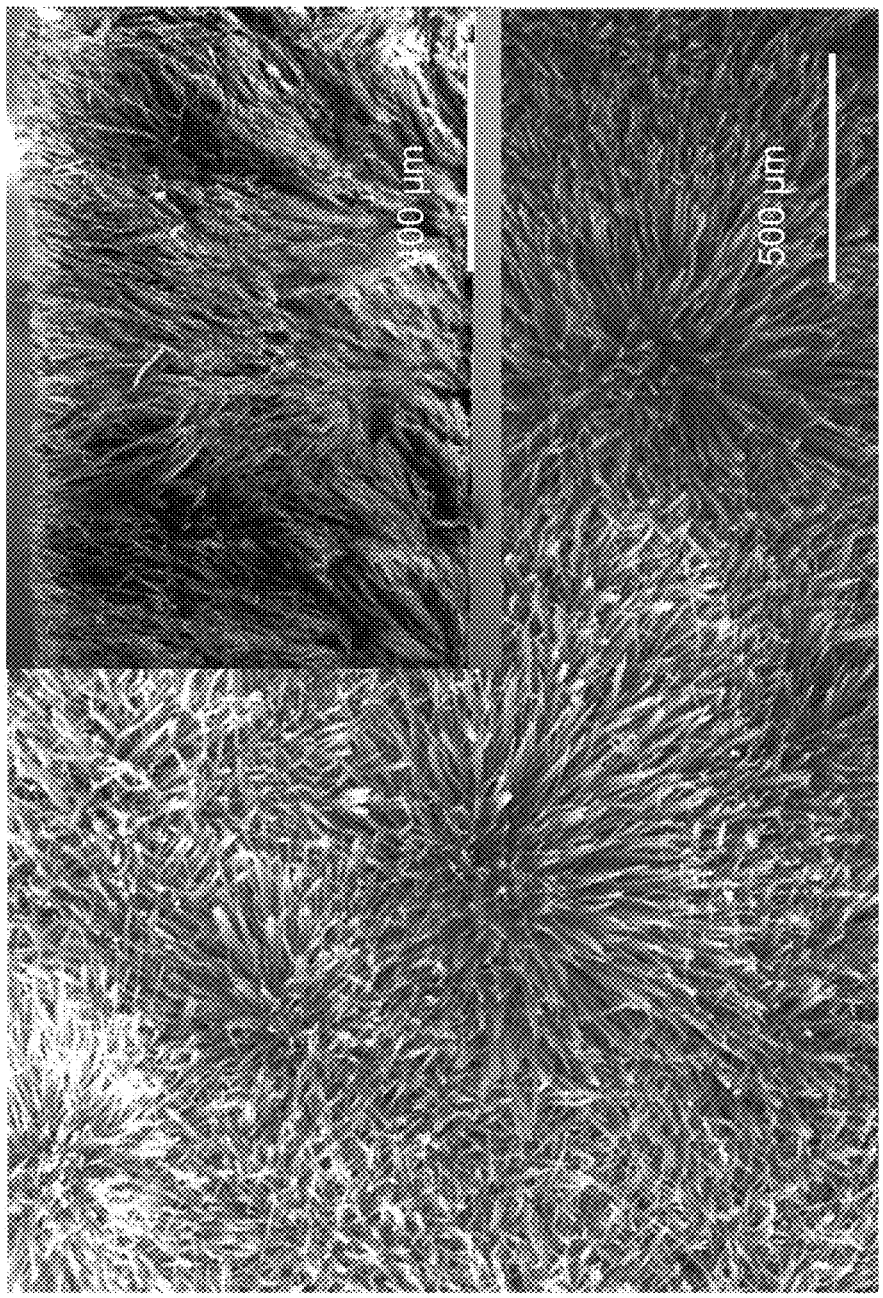
FIG. 7 provides an SEM top view image with cross-section view image insert of a PNIPAAm porous polymer structure.

FIG. 7 shows an SEM top view image with cross-section view image insert of a PNIPAAm porous polymer structure.

Figure 8:
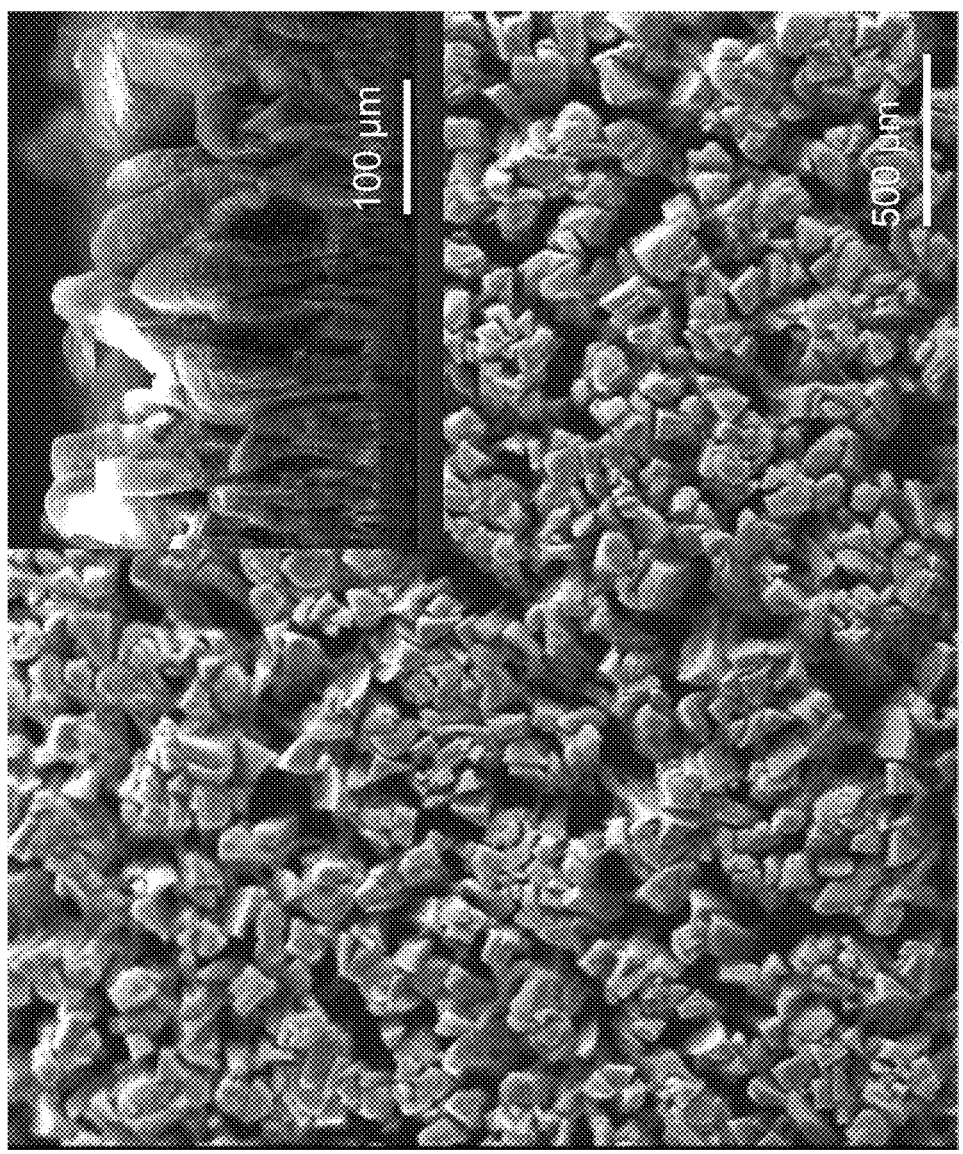
FIG. 8 provides an SEM top view image with cross-section view image insert of a P(MAA-co-EGDA) porous polymer structure.

FIG. 8 shows an SEM top view image with cross-section view image insert of a P(MAA-co-EGDA) porous polymer structure. The MAA template causes the P(MAA-co-EGDA) membranes to have a similar structure to the PMAA membranes, illustrated in comparing FIG. 8 and the 60 min image of FIG. 4. While PMAA membranes readily dissolved in water, the P(MAA-co-EGDA) membranes were not soluble in water, demonstrating that they were fully crosslinked.

This example demonstrates the compositional (e.g., various polymer and copolymer compositions) and structural versatility (e.g., pore sizes and thicknesses) of the VPP methods described herein.

Example 2

In order to study the effect of temperature and partial pressure of the monomer on the VPP methods, the monomer partial pressure and substrate temperature were independently varied during the formation of PMAA porous polymer structures.

Figure 9:
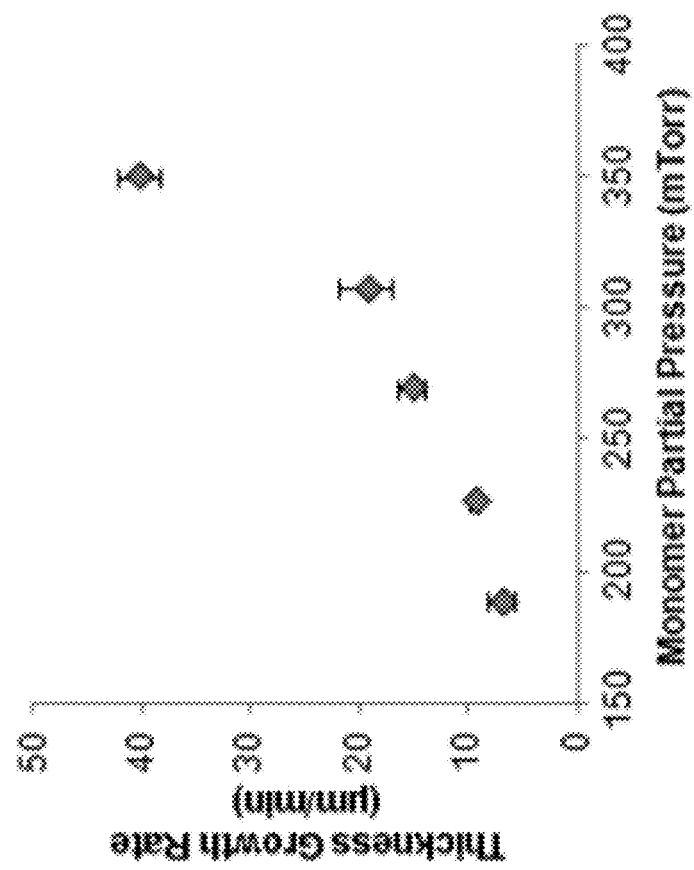
FIG. 9 provides a graph of growth rate versus monomer partial pressure for PMAA porous polymer structures.

The increase in monomer partial pressure ($P_m$) is believed to result in a larger driving force toward crystallization. The $P_m$ was varied from 140 to 350 mTorr by increasing the reaction pressure while keeping precursor flow rates, the substrate temperature (−10° C.) and the reaction time (20 minutes) constant. As shown in FIG. 9, increasing the $P_m$ led to an increase in the membrane growth rate, from 7±1 µm/min to as high as 40±2 µm/min.

Figure 10:
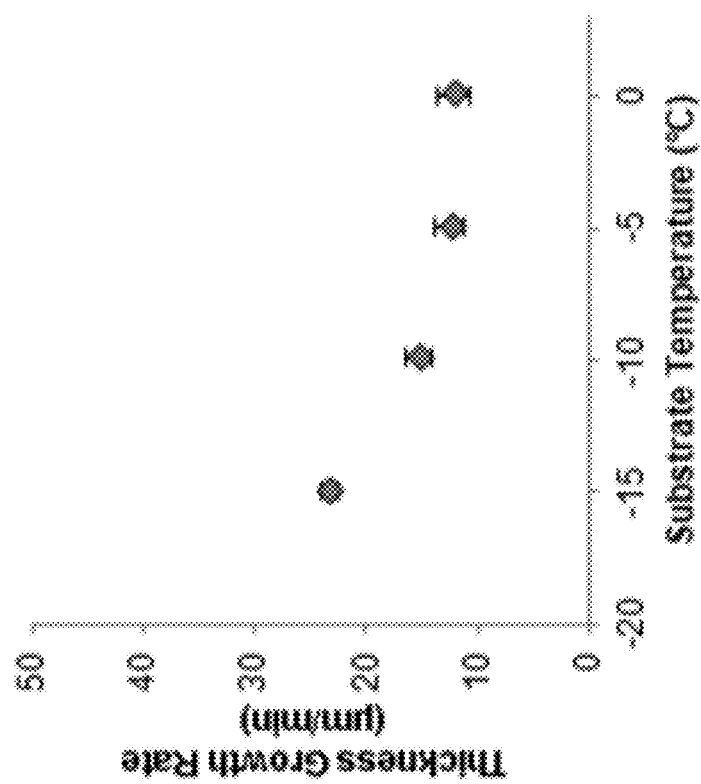
FIG. 10 provides a graph of growth rate versus substrate temperature for PMAA porous polymer structures.

To study the effect of temperature on membrane growth rate, the temperature was varied from 0° C. to −15° C., while maintaining a constant $P_m$ (270 mTorr) and reaction time (20 minutes), see FIG. 10. Decreasing the substrate temperature decreases the saturation pressure of the monomer and increases the driving force for monomer deposition, which leads to an increased growth rate from 12±2 µm/min at 0° C. to 23±1 µm/min at −15° C.

This example demonstrates that reaction conditions (e.g., $P_m$ and substrate temperature) can be varied to provide different growth rates.

Example 3

Figure 11:
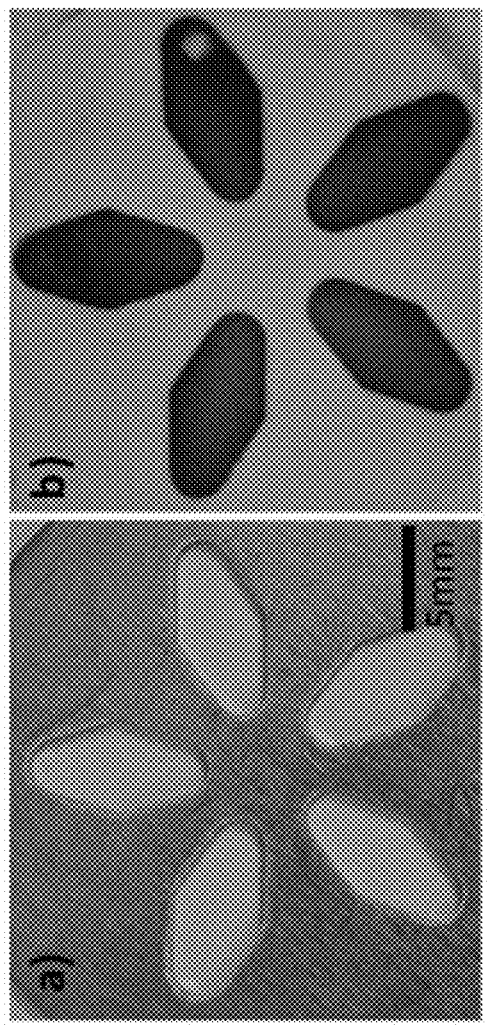
FIG. 11 provides a top-view photograph of a mask and a P(MAA-co-EGDA) porous polymer structure produced therewith.
Figure 12:
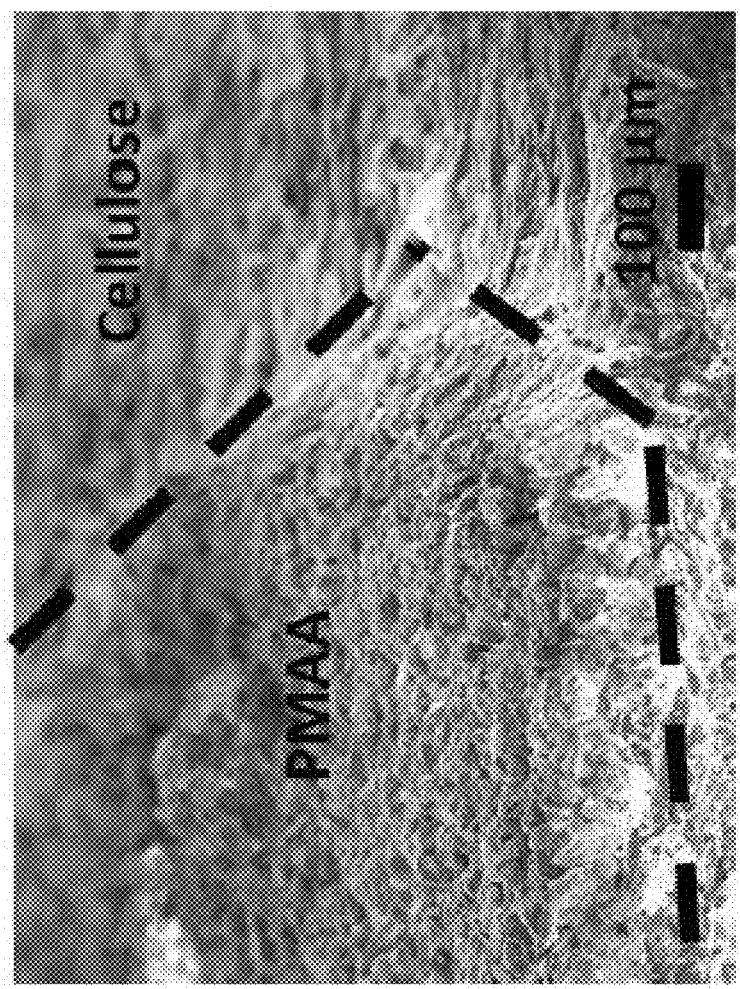
FIG. 12 provides a side-view SEM image of the P(MAA-co-EGDA) porous polymer structure of FIG. 11 at the edge of the porous polymer structure.

A P(MAA-co-EGDA) porous polymer structure (FIG. 11(*b*)) was formed on a cellulose paper substrate with a physical mask (FIG. 11(*a*)) thereon. FIG. 12 provides an SEM image of an edge of the P(MAA-co-EGDA) porous polymer structure on the cellulose paper substrate.

Example 4

Figure 13:
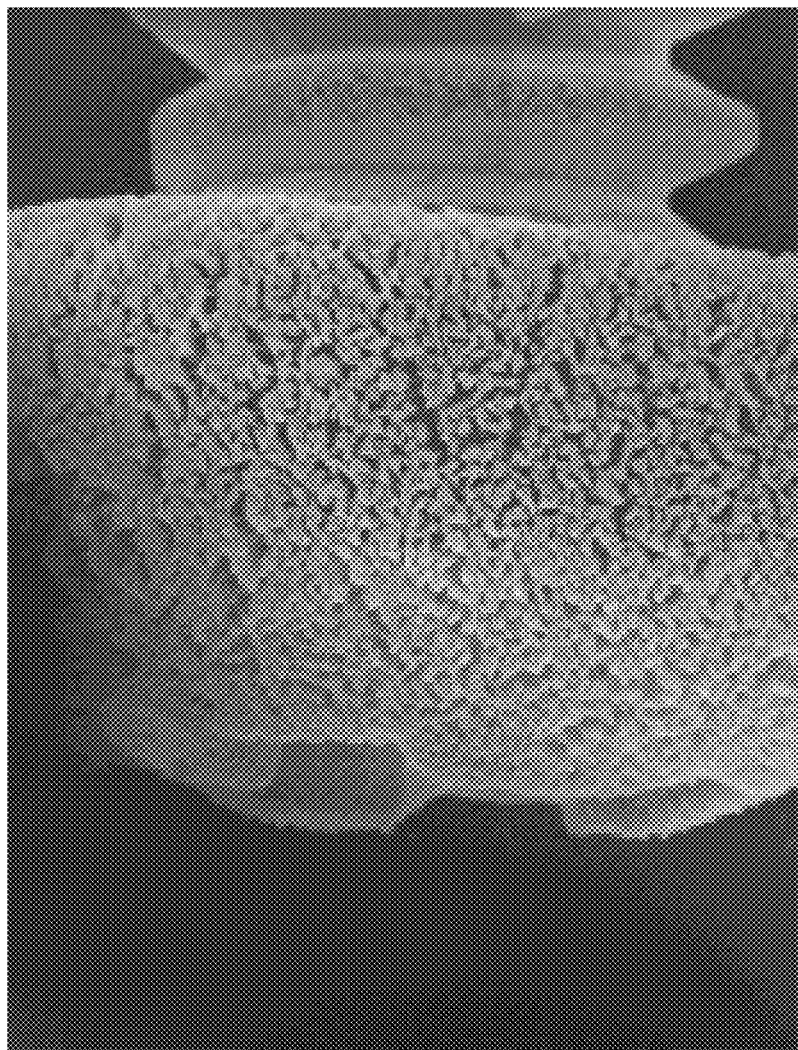
FIG. 13 provides a side-view SEM image of a P(MAA) porous polymer structure formed on a metal screw.

A PMAA porous polymer structure was formed on a metal screw substrate, see FIG. 13. This demonstrates that the VPP methods described herein advantageously allow for forming porous polymer structure on 3-dimensional structures.

Example 5

Samples of porous polymer structure of P(MAA-co-EGDA) was formed on a chromatography paper substrate at −10° C. using a stainless steel mask with circular holes (2.7 mm radius). The deposition times were varied between 2 and 30 min.

The porous polymer structures were dyed by immersing the samples in 0.001 wt % toluidine blue O in a buffered pH 8 solution for 12 h. The samples were then washed three times by immersion in a buffered pH 8 solution for a total of 36 h. The samples were then allowed to dry in ambient conditions and scanned using a color desktop printer (HP Deskjet F4480). The images were converted to gray scale, and line intensities were gathered using ImageJ. The intensities were normalized against unmodified chromatography paper treated with toluidine blue O in the same manner as that described above and averaged over two samples with two scans per sample taken perpendicular to each other.

Figure 14:
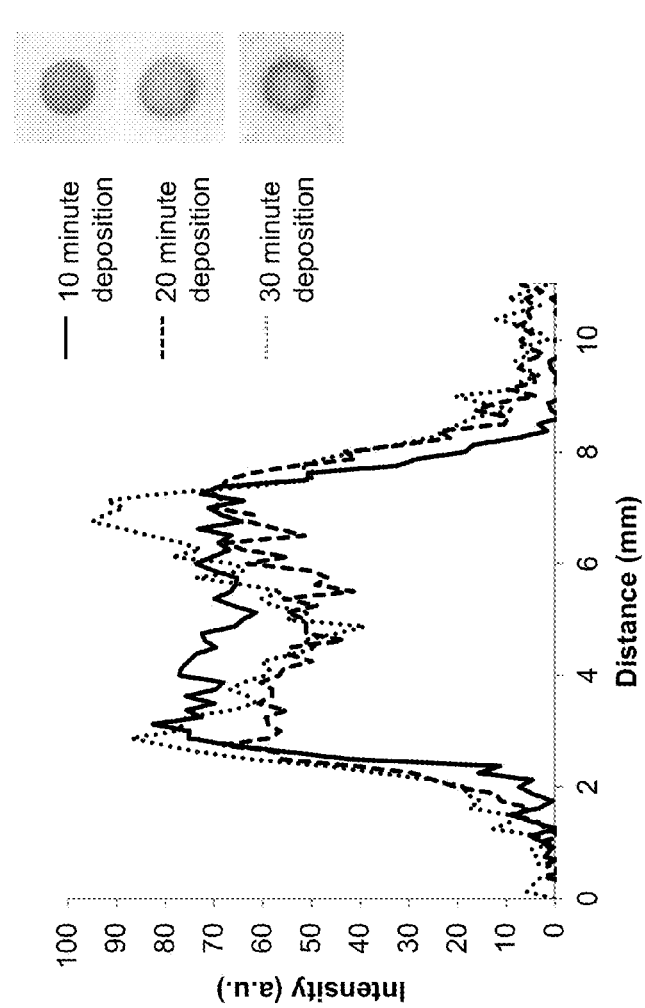
FIG. 14 provides intensity plots of a dye absorbed in porous polymer structures deposited on chromatography paper.

The intensity plots of the porous polymer structures on the chromatography paper (FIG. 14) show a radius and tapered edge, which is consistent with the structure of the porous polymer structures, as observed by SEM. Outside the area of the porous polymer structure, the intensity quickly returns to the baseline for all deposition times, indicating that there is negligible deposition of polymer in the areas covered by the mask. The absence of polymer under the mask is attributed to the depletion of monomer from the vapor-phase as a result of its deposition, preventing diffusion of monomer vapor throughout the paper substrate. The absence of polymer allows our fabrication technique to be used in applications where patterning of polymer deposition is essential, such as in sensing and lab-on-a-chip applications.

Example 6

Paper-based microfluidic devices were fabricated by printing wax (Xerox Phaser 8560N) onto Whatman chromatography paper and subsequently heating the paper to 180° C. for 3 min to melt the wax through the depth of the paper.

The ability of P(MAA-co-EGDA) porous polymer structures to selectively separate cationic analytes was analyzed by depositing P(MAA-co-EGDA) porous polymer structures for 10 min (as described in Example 5) at the inlet of the paper-based microfluidic channels using a stainless steel mask. Three µL of a buffered pH 6 solution containing 2 mg/mL crystal violet and 0.25 mg/mL ponceau S was then applied to the inlet of the channel and allowed to flow through the device in ambient conditions. Separation of the dyes was performed using three separate channels to confirm the result.

Figure 15:
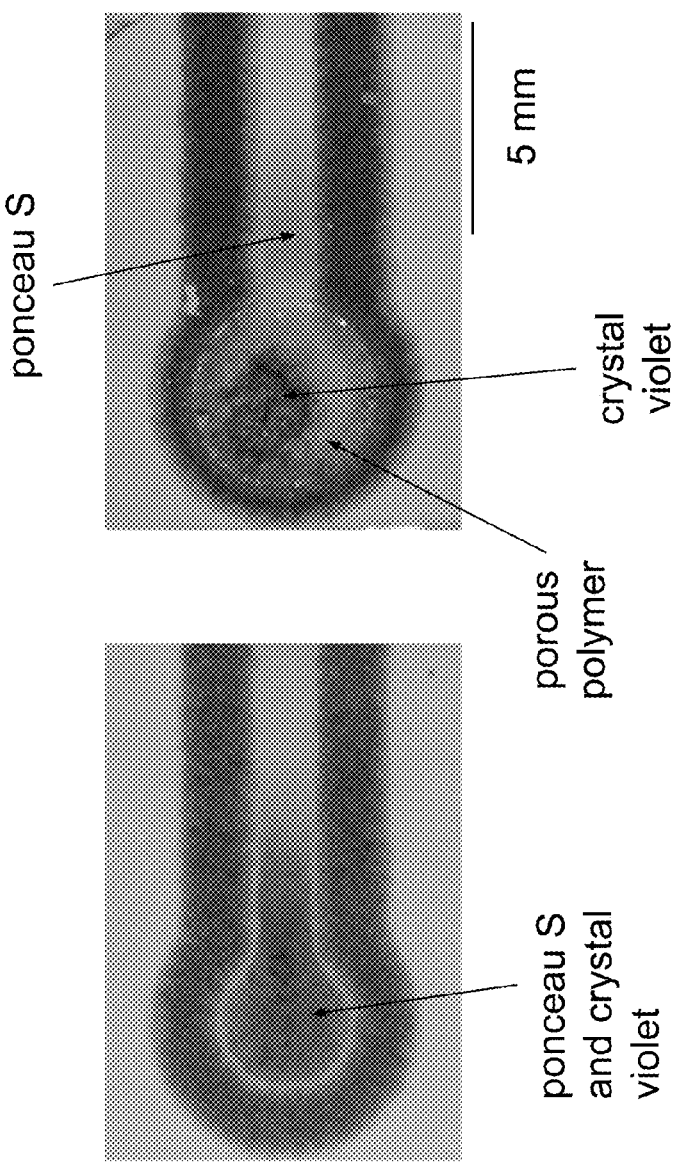
FIG. 15 provides a micrograph of a control sample (left) with no porous polymer structures in the channel and the P(MAA-co-EGDA) microfluidic channel (right).

FIG. 15 is a micrograph of a control sample (left) with no porous polymer structures on the channel and the P(MAA-co-EGDA) on the microfluidic channel (right). The control sample shows little to no separation of the two dyes (crystal violet and ponceau S). However, incorporation of a P(MAA-co-EGDA) porous polymer structure patterned onto the inlet of a paper-based microfluidic device allows for selective separation of crystal violet as a model cationic analyte from a mixture containing the anionic dye ponceau S. This separation is due to the increased electrostatic attraction between the electronegative P(MAA-co-EGDA) and the electropositive crystal violet, which is further enhanced by the high surface area provided by the porous polymer membrane.

Therefore, the embodiments presented herein are well adapted to attain the ends and advantages mentioned as well as those that are inherent therein. The particular embodiments disclosed above are illustrative only, as the embodiments presented herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments presented herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
cooling a substrate to a temperature at or below a freezing point of a monomer, wherein the monomer is capable of free-radical polymerization;
exposing the substrate to an initiator and the monomer, each in a vapor phase, wherein a concentration of the monomer in the vapor phase is above a saturation pressure of the monomer;
converting the initiator to a free radical;
crystalizing and depositing the monomer on the substrate; and
polymerizing at least some of the monomer on the substrate, thereby forming a porous polymer structure on the substrate;
wherein the porous polymer structure comprises microstructures that comprise a polymer, wherein the polymer is a polymerization product of reactants that comprise the free radical and the monomer, and
wherein the porous polymer structure has two types of pores: (1) intracrystalline pores within microstructures and (2) intercrystalline pores between the microstructures.

2. The method of claim 1, wherein a pore size of at least some of the intracrystalline pores is about 10 nm to about 10 microns.

3. The method of claim 1, wherein a pore size of at least some of the intercrystalline pores is about 1 micron to about 500 microns.

4. The method of claim 1 further comprising:
removing the porous polymer structure from the substrate.

5. The method of claim 1 further comprising:
after forming the porous polymer structure, removing the monomer having not polymerized from the surface and the porous polymer structure.

6. The method of claim 1, wherein the monomer is a first monomer; wherein the method further comprises exposing the substrate to a second monomer capable of free-radical polymerization in the vapor phase; wherein the first monomer and the second monomer are different; and wherein the porous polymer structure comprises a polymer that is a polymerization product of reactants that comprise the free radical, the first monomer, and the second monomer.

7. The method of claim 1 further comprising:
applying a mask to the substrate before exposing the substrate to the initiator and the monomer.

8. The method of claim 1 further comprising:
depositing a layer on at least a portion of the porous polymer structure.

9. The method of claim 8, wherein the layer is a conformal layer.

10. The method of claim 8, wherein the layer is a dense layer.

11. The method of claim 1, wherein the substrate comprises at least one selected from the group consisting of: a natural material, a metals, a ceramics, a polymer, and any hybrid thereof.

12. The method of claim 1, wherein the substrate has a 3-dimensional shape.

13. The method of claim 1, wherein the substrate is moving during (1) crystalizing and depositing the monomer as on the substrate and (2) polymerizing at least some of the monomer on the substrate.

14. The method of claim 1, wherein the monomer comprises at least one selected from the group consisting of: N-isopropylacrylamide, methacrylic acid, 2-hydroxyethyl methacrylate, ethylene glycol dimethacrylate, glycidyl methacrylate, methyl methacrylate, styrene, 1H,1H,2H,2H-perfluorodecyl acrylate, 4-vinylpyridine, o-nitrobenzyl methacrylate, pentafluorophenyl methacrylate, and any combination thereof.

15. The method of claim 1, wherein the initiator comprises at least one selected from the group consisting of: t-butyl peroxide, azobisisobutyronitrile, perfluorooctane sulfonyl fluoride, t-amyl peroxide, triethylamine, and any combination thereof.

16. The method of claim 1 further comprising:
exposing the substrate to a crosslinker.

17. A method comprising:
cooling a substrate to a temperature at or below a freezing point of a first monomer, wherein the first monomer is capable of free-radical polymerization;
exposing the substrate to a first initiator and the first monomer, each in a vapor phase, wherein a concentration of the first monomer in the vapor phase is above a saturation pressure of the first monomer;
converting the first initiator to a first free radical;
crystalizing and depositing the first monomer on the substrate;
polymerizing at least some of the first monomer on the substrate, thereby forming a porous polymer structure on the substrate;
cooling the porous polymer structure to a temperature at or below a freezing point of a second monomer, wherein the second monomer is capable of free-radical polymerization;
exposing the porous polymer structure to a second initiator and the second monomer, each in the vapor phase, wherein a concentration of the second monomer in the vapor phase is above a saturation pressure of the second monomer;
depositing the second monomer as on the porous polymer structure;
polymerizing at least some of the second monomer on the porous polymer structure, thereby producing the porous polymer structure with a first layer comprising a polymer of the first monomer and a second layer comprising a polymer of the second monomer.

18. An article comprising:
a porous polymer structure that comprises microstructures that comprise a polymer, wherein the polymer is a polymerization product of reactants that comprise a free radical and a monomer, each in a vapor phase;
wherein the porous polymer structure has two types of pores: (1) intracrystalline pores within the microstructures; and (2) intercrystalline pores between the microstructures, wherein a pore size of at least some of the intracrystalline pores is about 10 nm to about 10 microns, and wherein a pore size of at least some of the intercrystalline pores is about 1 micron to about 500 microns, and
wherein said monomer in the vapor phase is above a saturation pressure of the monomer.

19. An article of claim 18, wherein said pores are due to the monomer deposition caused by said monomer in the vapor phase when it is above a saturation pressure of the monomer.

* * * * *